UNITED STATES PATENT OFFICE.

THOMAS F. WILKINS, OF LONDON, COUNTY OF MIDDLESEX, ENGLAND, ASSIGNOR TO GEORGE MANDER ALLENDER, OF SAME PLACE.

PRESERVATION OF BUTTER AND OTHER FATS.

SPECIFICATION forming part of Reissued Letters Patent No. 9,892, dated October 11, 1881.

Original No. 226,467, dated April 13, 1880. Patented in England June 23, 1879. Application for reissue filed August 10, 1881.

*To all whom it may concern:*

Be it known that I, THOMAS FOSTER WILKINS, of Upper Baker Street, London, in the county of Middlesex and Kingdom of England, have invented certain new and useful Improvements in the Treatment of Butter and other Fats, which are fully set forth in the following specification.

This invention relates to the preservation of organic matter, and especially fats, by means of phosphoric acid mechanically mingled therewith.

I will describe the invention as applied to the preservation of butter.

In carrying out my invention I take of glacial metaphosphoric acid in solution, say twenty-four grains of acid for every pound of butter, and I mechanically and thoroughly mix, blend, and incorporate the same with the butter by any suitable means. The preservative process is then complete, and the butter thus prepared may be placed in any suitable vessel for domestic or commercial purposes. The strength of the solution may vary according to circumstances and requirement, say from three drams to one ounce to the ounce of water.

Instead of applying the acid in solution, I may apply it in a solid crushed state.

The mechanical admixture of the metaphosphoric acid with the butter as carried out in practicing my invention effects the preservation of the butter by bringing the reagent in contact with the caseine and other substances which would otherwise putrefy without subjecting the butter to the change which would be induced by melting.

It is preferable that the butter should be treated with the preservative agent as soon after it is taken from the churn as possible, and that it be thoroughly freed from the buttermilk; also, that the flavor will be improved by the addition of a small quantity of salt.

Having now described the nature of my invention, and in what manner the same is or may be performed, I would have it distinctly understood that I do not confine myself to glacial metaphosphoric acid, nor to the relative portions hereinbefore given, as such may be varied to suit various kinds of butter, the length of time for which it is desired to preserve the butter, the atmospheric conditions under which it is prepared, and other causes. The proportion of the preservative agent need not, however, in any case exceed one dram to one pound of butter.

I am aware that phosphates and phosphites have been long known as antiseptics, and also that metaphosphoric acid in solution has been proposed as a preservative for fish, vegetables, and fruits, and for hardening fats by being melted therewith. Such I do not claim as my invention.

I claim as my invention—

1. The method herein described of preserving fats and other organic matter by mechanically mingling phosphoric acid therewith, as herein specified.

2. As a new article of manufacture, fat containing phosphoric acid mechanically incorporated therewith, whereby the same is preserved, substantially as set forth.

THOMAS FOSTER WILKINS.

Witnesses:

RICHARD MANFIELD,
8½ *Angel Court, E. C., Clerk.*
C. E. STEEVENS,
31 *St. Petersburg Place, London, Clerk.*